Dec. 12, 1967  R. WECHSLER  3,358,205

CONTROL CIRCUIT

Filed Sept. 22, 1964

INVENTOR
REUBEN WECHSLER
BY
*Mueller and Aichele*
ATTYS.

United States Patent Office 3,358,205
Patented Dec. 12, 1967

3,358,205
CONTROL CIRCUIT
Reuben Wechsler, Phoenix, Ariz., assignor to Motorola, Inc., Franklin Park, Ill., a corporation of Illinois
Filed Sept. 22, 1964, Ser. No. 398,343
5 Claims. (Cl. 318—332)

This invention relates to control circuits, and more particularly to a speed control circuit for an electric motor.

Series type universal motors tend to lose torque when operating at low speed unless equipped with a motor speed control circuit of proper design. Semiconductor controlled rectifiers, sometimes referred to as silicon controlled rectifiers or SCR's, may be utilized in such motor speed control circuits. The semiconductor controlled rectifier conducts to supply motor current during a portion of each cycle of the alternating current of the power supply, and the torque may accordingly be varied by varying the duration of such conduction period and hence the average voltage supplied the motor. "Average" in this sense and as used subsequently herein in both specification and claims, refers to the full cycle average of the absolute magnitude of the voltage, disregarding sign.

Some circuits maintain torque at reduced speed by making use of a feedback signal which is derived from the voltage induced in the armature of the motor during the portion of the input signal that the SCR is not conducting. When this type of circuit is used with a series type universal motor, either the amount of induced EMF due to the residual field must be accepted, or a circuit must be designed which will energize the field separately during that portion of the cycle. The usual approach has been to make use of the residual field since the other alternative may become somewhat elaborate. A major disadvantage of this approach is that separate access is required to the field and armature windings, making it difficult to adapt the circuit for use as a separate control.

Accordingly, it is an object of this invention to provide an improved speed control circuit for an electric motor.

Another object of the invention is to provide a motor control circuit which does not require separate connections to the motor field and armature windings and can therefore be conveniently built into an appliance or used in a control box separated from the appliance.

A feature of the invention is the provision of a motor speed control circuit utilizing a semiconductor controlled rectifier for controlling the average voltage supplied to the motor, which controlled rectifiers' conduction time is controlled by means of a feedback signal derived from the load current.

Still another feature of the invention is the provision of a motor control circuit utilizing an SCR and a full wave bridge rectifier for controlling the voltage applied to the motor, and the further provision of a feedback signal derived from load current which is utilized to control the firing of the SCR and thereby maintain torque at reduced speeds.

In accordance with the invention, a motor speed control circuit for an electric motor utilizes a full wave rectifier connected with a semiconductor controlled rectifier to form a series circuit adapted for connecting the motor to an A.C. energizing circuit. The semiconductor controlled rectifier switches on and off, with the conduction time thereof controlling the average voltage applied to the motor. A relaxation oscillator is connected to the semiconductor controlled rectifier for applying pulses thereto for turning the controlled rectifier on. The controlled rectifier turns off when the full wave rectified voltage (pulsating D.C.) thereacross drops to a given level. A resistor is provided in series with the semiconductor controlled rectifier and senses the magnitude of current conducted therethrough, which current corresponds to the magnitude of load current drawn by the motor. This resistor is coupled to the relaxation oscillator to control the cycle time thereof in inverse proportion to the current sensed by the resistor. Accordingly, the relaxation oscillator will turn the semiconductor controlled rectifier on after a turn off period which decreases in response to increased current sensed by the resistor. The average voltage to the motor is correspondingly increased in response to increased load current.

Figure 1:
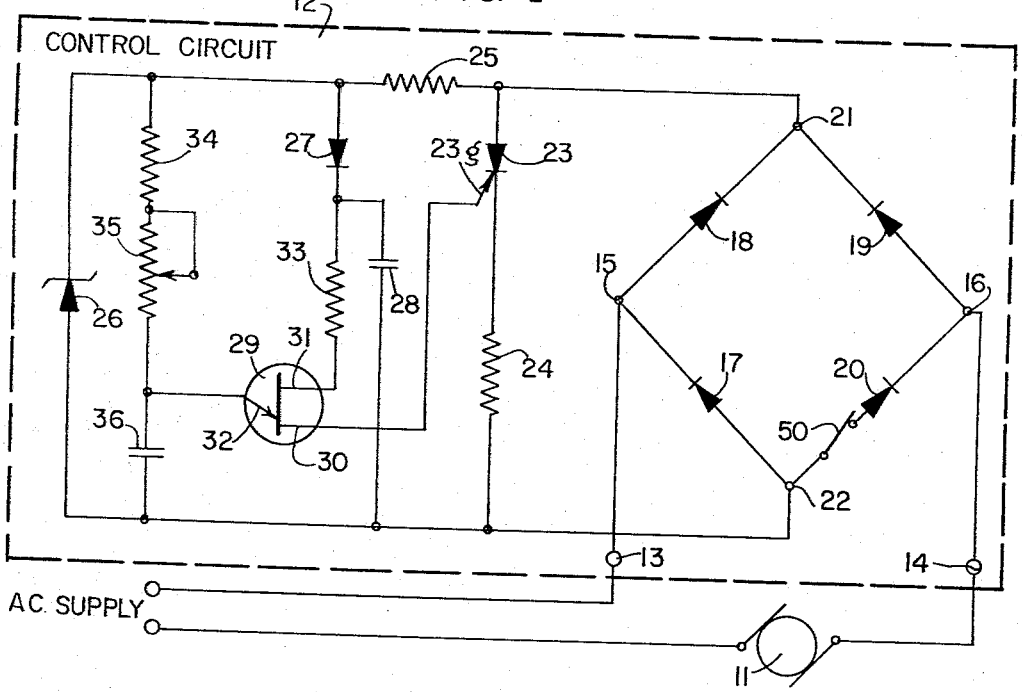
FIG. 1 is a schematic diagram of a circuit constructed in accordance with the invention.

Referring more particularly to FIG. 1, a series type universal motor 11 is shown connected to a motor control circuit 12 across a source of alternating current. Control circuit 12 has terminals 13 and 14 electrically connected to the input corners 15 and 16 of a bridge rectifier comprised of diodes 17, 18, 19 and 20. A full wave rectified AC signal (pulsating D.C.) will appear across the output corners 21 and 22 of the bridge rectifier.

A semiconductor controlled rectifier 23 is connected in series with a resistor 24 across output corners 21 and 22 of the bridge rectifier. A resistor 25 and a zener diode 26 are also connected in series across output corners 21 and 22. A diode 27 and a capacitor 28 are series connected in stated order from the juncture between zener diode 26 and resistor 25 to output corner 22.

Semiconductor controlled rectifier 23 has a gate 23g to which is connected a relaxation oscillator for supplying pulses to controlled rectifier 23 for turning the same on. The relaxation oscillator is comprised of a unijunction transistor 29 having a base one 30, a base two 31, and an emitter 32, base two 31 is connected through a resistor 33 to the juncture between diode 27 and capacitor 28. Base one 30 of unijunction transistor 29 is connected to gate 23g of semiconductor controlled rectifier 23. A resistor 34 and a variable resistor 35 are series connected from the juncture between zener diode 26 and resistor 25 to the emitter 32 of transistor 29. A storage capacitor 36 connects emitter 32 with output corner 22 of the bridge rectifier. The potentiometer 35 may be varied to control the cycle time of the relaxation oscillator and hence the average voltage to motor 11.

The circuit of the invention operates to control the average voltage supplied to motor 11 and drives a feedback from the load current which serves to increase the average voltage in response to an increase in load current. Diodes 17, 18, 19 and 20 form a bridge which applies a full wave rectified voltage to semiconductor controlled rectifier 23. When semiconductor controlled rectifier 23 is conductive, the bridge appears as a very low resistance in series with motor 11. The normal line voltage, less the drop across two of the diodes 17–20, the semiconductor controlled rectifier 23, and resistor 24, is applied to the motor. Reduction of the average voltage applied to the motor 11 is obtained by delaying the firing of controlled rectifier 23 until the later portion of the cycle. The speed of motor 11 is reduced proportionally.

Provision is made for a feedback which senses the load current drawn by motor 11 to maintain torque at reduced speeds. Phase delay of the controlled rectifier firing is attained by the relaxation oscillator. The oscillator operates by the charging of capacitor 36 through resistors 35 and 34 from the voltage level established by the zener diode 26. When capacitor 36 charges up to the firing voltage of unijunction transistor 29, it conducts, triggering the control rectifier 23. As capacitor 36 discharges, the emitter to base one current of unijunction transistor 29 drops below the holding current level and the unijunction transistor ceases to conduct.

Figure 2:
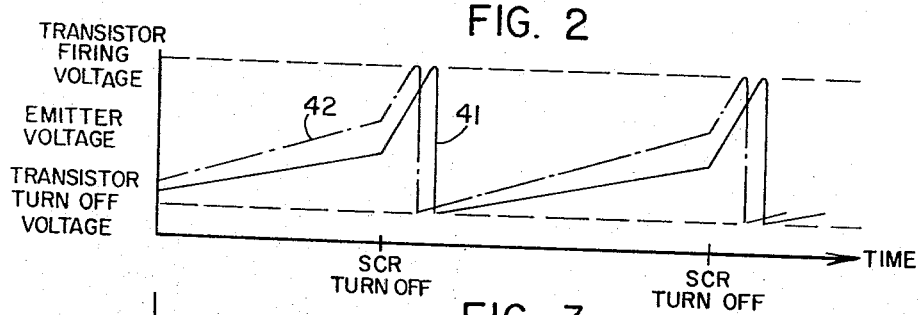
FIG. 2 is a graph illustrating the variation in emitter voltage of the unijunction transistor in the circuit of FIG. 1, with respect to time, for two conditions of load current.

While controlled rectifier 23 is conducting, the voltage drop between the output corners 21 and 22 of the bridge rectifier falls below the breakdown voltage of zener diode 26. Therefore, during the conduction period of controlled rectifier 23, the charging of capacitor 36 is controlled by the voltage drop across corners 21 and 22. Since the voltage across resistor 24 is a function of motor current, capacitor 36 is charged during the conduction period to a value which is proportional to motor current. The value of resistor 24 is chosen such that capacitor 36 will not charge to a sufficiently high voltage to fire the unijunction transistor 29 during the conduction period of controlled rectifier 23. It should be noted, however, that the amount of additional charging required to fire the unijunction transistor 29 has been decreased by an amount proportional to the motor current. This is illustrated in FIG. 2 wherein the solid line 41 represents a given condition of load current and wherein the dash line 42 represents a condition of greater load current. The emitter voltage attained at the turn off point of controlled rectifier 23 will be greater for the condition of greater load current. It will be seen that subsequent to turn off of controlled rectifier 23, the charge on capacitor 36 will arise at the same rate for either condition of load current. However, for condition 42 the firing voltage of transistor 29 is attained prior to that for condition 41.

Figure 3:
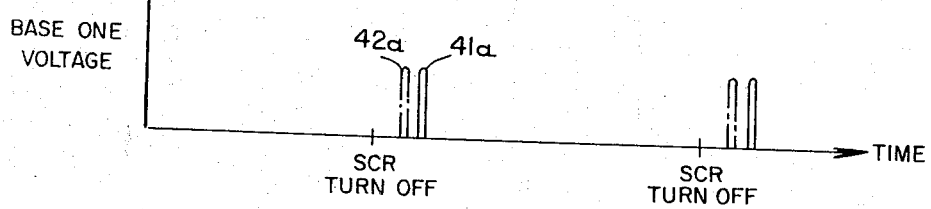
FIG. 3 is a graph illustrating the pulse voltage applied to the SCR of the circuit of FIG. 1 with respect to time for two different conditions of load current corresponding to the conditions of FIG. 2.

The result of such timing is shown in FIG. 3 wherein the pulse supplied to gate 23g of controlled rectifier 23 occurs a shorter period of time after turn off of controlled rectifier 23 for condition 42a, than for condition 41a. These conditions correspond respectively to conditions 42 and 41 in FIG. 2. Because the turn off period of controlled rectifier 23 will be less for condition 42a, that is, the condition of greater load current, the average voltage supplied to motor 11 will be increased due to the fact that the controlled rectifier 23 is conductive through a greater portion of the A.C. cycle. Thus, the firing angle at which the unijunction 29 will fire has been advanced in proportion to the motor current. As the motor is loaded and draws more current, the firing angle of the unijunction transistor is advanced even more, causing a proportionate increase in the average voltage supplied to the motor 11 and a consequent increase in its available torque.

Since the firing voltage of the unijunction transistors 29 depends upon the base two to base one voltage, it is necessary to support the base two voltage during the conduction period of controlled rectifier 23 to prevent the feedback voltage from firing the unijunction transistor 29. Diode 27 and capacitor 28 perform this function.

Nominal values for resistor 24 can be calculated from the following equation:

$$R = \frac{2}{\text{maximum rated motor current (RMS)}}$$

Exact values for resistor 24 will depend somewhat upon the motor characteristics. It is suggested, therefore, that resistor 24 be a rheostat which can be calibrated in terms of motor current so that the speed control can be adapted to many different motors. The minimum operating speed can be reduced by approximately ½ by changing to half-wave operation. A switch 50 may be provided to permit the circuit to be converted to half wave operation. A practical operating circuit has been constructed with components of the following values:

Semiconductor controlled rectifier 23—Motorola MCR808-4
Diodes 18 and 19—Motorola MR324, 200 volts 18 amp. rectifier
Unijunction transistor 29—2N2160
Diodes 17 and 20—Motorola MR324R, 200 volts 18 amps. reverse polarity rectifier
Diode 27—1N4001, 50 volts 1 amp. rectifier
Zener diode 26—1N751A, 5.1 volts, 400 milliwatt zener diode
Resistor 33—330 ohm, ½ watt
Resistor 24 (to be calculated from above formula)
Resistor 25—18K, 2 watts
Resistor 34—3.9K, ½ watt
Resistor 35—50K potentiometer
Capacitor 36—.1 microfarad
Capacitor 28—10 mocrofarads, 10 volts It may therefore be seen that the invention provides an improved motor speed control circuit for an electric motor. The circuit controls the average voltage applied to the motor in accordance with load current by deriving a feedback signal from the load current, and does not require separate connections to the motor field and armature windings. The circuit, accordingly, can be conveniently built in an appliance or used in a control box separated from the appliance.

I claim:

1. A motor speed control circuit for connecting an electric motor to an alternating current energy circuit, including in combination, bridge rectifier means, a semiconductor controlled rectifier connected to said rectifier means and forming a series circuit therewith for connecting the motor to the energizing circuit, and control means connected to said semiconductor controlled rectifier for applying pulses thereto for turning said semiconductor controlled rectifier on, said rectifier means forming a full wave rectifier for applying a rectified voltage to said semiconductor controlled rectifier for turning the same off when the rectified voltage thereacross drops to a given level, said control means including a portion connected in series with said semiconductor controlled rectifier and sensing the magnitude of current conducted therethrough so that said control means controls the pulse cycle time thereof in inverse proportion to the current sensed by said portion thereof, said control means turning said semiconductor controlled rectifier on after a turn off period which decreases in response to increased current sensed thereby, whereby the average voltage to the motor is increased in response to increased load current.

2. A motor speed control circuit for connecting an electric motor to an alternating current energizing circuit, including in combination, bridge rectifier means, a semiconductor controlled rectifier connected to said rectifier means and forming a series circuit therewith for connecting the motor to the energizing circuit, a relaxation oscillator including a unijunction transistor connected to said semiconductor controlled rectifier for applying pulses thereto for turning said semiconductor controlled rectifier on, said bridge rectifier means forming a full wave rectifier for applying a rectified voltage to said semiconductor controlled rectifier for turning the same off when the full wave rectified voltage thereacross drops to a given level, said relaxation oscillator including a storage capacitor chargeable to a given voltage level to fire said unijunction transistor, and resistance means connected in series with said semiconductor controlled rectifier and sensing the magnitude of current conducted therethrough, said sensing means being coupled to said storage capacitor for charging the same at a rate proportional to the current sensed by said sensing means, said relaxation oscillator turning said semiconductor controlled rectifier on after a turn off period which decreases in response to increased current sensed by said resistance means, whereby the average voltage to the motor is increased in response to increased load current.

3. A motor speed control circuit for an electric motor, including in combination, a bridge rectifier having input and output corners, said input corners being adapted for connection with the electric motor across a source of alternating current potential, a semiconductor controlled rectifier connected across said input corners of said bridge rectifier and being responsive to applied pulses to permit current flow between said output corners and thereby complete an energizing circuit for the motor, said semiconductor controlled rectifier turning off when voltage supplied thereto from said bridge rectifier falls below a given level, pulse means connected to said semiconductor controlled rectifier for applying pulses thereto to turn the same on, and control means connected to said pulse means for controlling the timing of pulses applied to said semiconductor controlled rectifier to thereby control the average voltage applied to the motor, said control means including sensing means connected in series with said semiconductor controlled rectifier for sensing the load current therethrough, said control means being responsive to the current sensed by said sensing means and causing said pulse means to produce a turn on pulse a period of time after turn off of said semiconductor controlled rectifier which is inversely proportional to the load current.

4. A motor speed control circuit for an electric motor, including in combination, a bridge rectifier having input and output corners, said input corners being adapted for connection with the electric motor across a source of alternating current potential, a semiconductor controlled rectifier connected across said input corners of said bridge rectifier and being responsive to applied pulses to turn on and permit current flow between said output corners to complete an energizing circuit for the motor, said semiconductor controlled rectifier turning off when the full wave rectified voltage thereacross drops to a given level, a relaxation oscillator connected to said semiconductor controlled rectifier for applying pulses thereto, said relaxation oscillator having a storage capacitor for controlling the cycle time thereof in accordance with charge applied thereto, thereby controlling the average voltage applied to the motor, and resistance means connected in series with said semiconductor controlled rectifier for sensing the current therethrough, said resistance means being coupled to said storage capacitor and causing said capacitor to charge in proportion to current in said resistance means, whereby the average voltage to the motor is increased in response to increased load current.

5. A motor speed control circuit for an electric motor, including in combination, a bridge rectifier having input and output corners, said input corners being adapted for connection with the electric motor across a source of alternating current potential, a semiconductor controlled rectifier connected across said input corners of said bridge rectifier and being responsive to applied pulses to turn on and permit current flow between said output corners to complete an energizing circuit for the motor, said semiconductor controlled rectifier turning off when the full wave rectified voltage thereacross drops to a given level, a unijunction transistor having base one, base two, and emitter regions, said base one region being connected to said semiconductor controlled rectifier for supplying turn on pulses thereto, means connecting said base two region to one of said output corners of said bridge rectifier, and a trigger circuit for said transistor including resistance means and capacitance means connected across said output corners with the juncture between said resistance means and said capacitance means being connected to said emitter region of said transistor, and a resistor series connected with said semiconductor controlled rectifier, said capacitance means being charged according to the voltage drop across said resistor when said semiconductor controlled rectifier is turned on, said capacitance means thereby accumulating a charge at a rate in accordance with current through said resistor when said semiconductor controlled rectifier is conducting, said capacitance means accumulating further charge in accordance with said resistance means when said semiconductor controlled rectifier is not conducting to trigger said transistor and discharge through said emitter and base one regions thereof to apply a turn on pulse to said semiconductor controlled rectifier after a period subsequent to turn off of said semiconductor controlled rectifier which period varies inversely with current through said resistor.

References Cited

UNITED STATES PATENTS 3,146,392    8/1964    Sylvan.
3,210,605    10/1965    Jones.

ORIS L. RADER, *Primary Examiner.*

J. J. BAKER, *Assistant Examiner.*